United States Patent
Fujimura et al.

(10) Patent No.: US 9,202,435 B2
(45) Date of Patent: Dec. 1, 2015

(54) CORRECTION DEVICE FOR DISPLAY DEVICE AND CORRECTION METHOD FOR DISPLAY DEVICE

(75) Inventors: Ryuuichi Fujimura, Tokyo (JP); Katsuyuki Matsui, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 231 days.

(21) Appl. No.: 13/990,019

(22) PCT Filed: Nov. 30, 2010

(86) PCT No.: PCT/JP2010/071401
§ 371 (c)(1),
(2), (4) Date: Jun. 19, 2013

(87) PCT Pub. No.: WO2012/073342
PCT Pub. Date: Jun. 7, 2012

(65) Prior Publication Data
US 2013/0265342 A1 Oct. 10, 2013

(51) Int. Cl.
*G09G 5/06* (2006.01)
*G09G 5/02* (2006.01)
*H04N 9/31* (2006.01)

(52) U.S. Cl.
CPC .. *G09G 5/06* (2013.01); *G09G 5/02* (2013.01); *H04N 9/3182* (2013.01); *G09G 2320/0693* (2013.01); *G09G 2360/145* (2013.01)

(58) Field of Classification Search
CPC ........................................................ G09G 5/06
See application file for complete search history.

(56) References Cited

U.S. PATENT DOCUMENTS

2008/0272701 A1  11/2008  Park et al.
2010/0238301 A1*  9/2010  Kojima .................... 348/207.1

FOREIGN PATENT DOCUMENTS

| CN | 101542579 A | 9/2009 |
| CN | 101697272 A | 4/2010 |
| JP | 2002-072997 A | 3/2002 |

(Continued)

OTHER PUBLICATIONS

International Search Report in PCT/JP2010/071401, dated Dec. 28, 2010 (English Translation Thereof).

(Continued)

*Primary Examiner* — Jason Olson
(74) *Attorney, Agent, or Firm* — McGinn IP Law Group PLLC (57) ABSTRACT

A correction device for a display device includes a detection unit which detects the measured XYZ values of a CIE1931 color system; a first conversion unit which calculates the measured X10Y10Z10 values of a CIE1964 color system based on the measured XYZ values with reference to the characteristics of the display device; a second conversion unit which calculates the target X10Y10Z10 values of the CIE1964 color system based on the target XYZ values representing tristimulus values of a target color in the CIE1931 color system; a correction value calculation unit which compares the measured X10Y10Z10 values with the target X10Y10Z10 values so as to produce a correction value which allows those values to match each other; a correction value calibration unit which rewrites the correction value with a correction value of the CIE1931 color system; and a compensation unit which performs color correction on the display device.

18 Claims, 5 Drawing Sheets

(56) References Cited

FOREIGN PATENT DOCUMENTS

| | | |
|---|---|---|
| JP | 2002-204372 A | 7/2002 |
| JP | 2010-256899 A | 11/2010 |

OTHER PUBLICATIONS

Chinese Office Action dated Aug. 25, 2014 with an English translation thereof.

* cited by examiner

CORRECTION DEVICE FOR DISPLAY DEVICE AND CORRECTION METHOD FOR DISPLAY DEVICE

TECHNICAL FIELD

The present invention relates to a correction device for correcting a display device and a correction method for a display device.

BACKGROUND ART

In general, a display device is subjected to correction using a target color such as a white color of paper and a white color of another display device. In such a case, a target color or a colorimetric value of an optical sensor is defined using XYZ values in the industry standard CIE1931 color system. The CIE1931 color system having XYZ values is adopted in a display device subjected to observation with a viewing angle of 4° or less (e.g. a viewing angle of 2° or less).

Conventionally, various standards regarding display devices and personal computers have been subjected to color management according to the CIE1931 color system having XYZ values. For example, Patent Literature 1 discloses a color matching process using color information of the CIE1931 color system.

CITATION LIST

Patent Literature

Patent Literature 1: Japanese Patent Application Publication No. 2002-072997

SUMMARY OF INVENTION

Technical Problem

However, when a large-scale display device is subjected to correction using values according to the CIE1931 color system, it may arise a problem such as difficulty in obtaining perceptual color matching and difficulty in accurately correcting a display device.

In observation, a viewing angle used for evaluating a display device having a large screen may exceed 4° due to a screen size. In order to use a large screen, it is necessary to employ X10Y10Z10 values of the CIE1964 color system, thus achieving perpetually superior color matching.

However, X10Y10Z10 values of the CIE1964 color system may exhibit visual characteristics different from those allowed for an observatory sight (within a viewing angle of 4°) defined by XYZ values of the CIE1931 color system. When a target color or a colorimetric value of an optical sensor is defined using XYZ values of the CIE1931 color system, it is difficult to achieve perceptual color matching, and it is difficult to perform accurate correction.

Solution to Problem

In order to solve the above problem, the present invention provides detection means which measures an image displayed in a display device so as to detect measured XYZ values representing tristimulus values of the CIE1931 color system; first conversion means which calculates measured Z10Y10Z10 values of the CIE1964 color system based on the measured XYZ values of the CIE1931 color system with reference to the characteristics of a display device; second conversion means which calculates target X10Y10Z10 values of the CIE1964 color system based on target XYZ values representing tristimulus values of a target color according to the CIE1931 color system; correction value calculation means which compares the measured X10Y10Z10 values with the target X10Y10Z10 values so as to produce a correction value allowing the measured X10Y10Z10 values to match the target X10Y10Z10 values; correction value calibration means for rewriting the correction value of the CIE1964 color system, corresponding to the characteristics of a display device, with a correction value of the CIE1931 color system; and correction means which performs color correction on the display device by use of the rewritten correction value of the CIE1931 color system.

Advantageous Effects of Invention

The present invention is able to perform color correction having compatibility with the CIE1931 color system having XYZ values in a display device having visual characteristics according to the CIE1964 color system having X10Y10Z10 values.

DESCRIPTION OF EMBODIMENTS

Hereinafter, a correction device for a display device according to the present invention will be described with reference to the drawings. In this embodiment, the display characteristics of a display device are corrected using a lookup table (LUT: conversion of input/output characteristics) installed in a display device.

Figure 1:
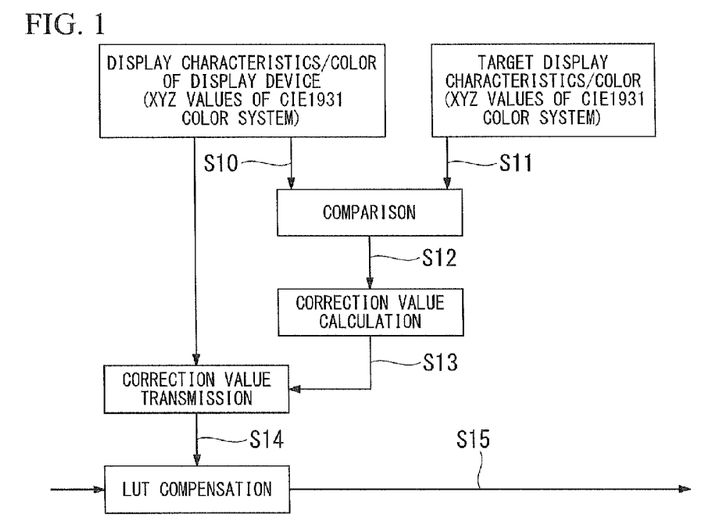
FIG. 1 A flowchart illustrating the procedure for correcting color information in a display device.

FIG. 1 is a flowchart illustrating a general procedure for correcting color information of a display device, defining the basis of the concept of the present invention.

A display device of the present invention measures and detects the display characteristics (XYZ values of the CIE1931 color system) of a display device with a sensor (step S10). Next, the pre-recorded target characteristics (generally known as chromaticity of a white color and primary colors, gradation luminance characteristics) (XYZ values of the CIE1931 color system) are read from a storage device (step S11); the read target characteristics are compared with the detected display characteristics (step S12); a correction value is calculated (step S13); then, LUT (Look Up Table) data, i.e. correction characteristics stored in a memory device, are rewritten (step S14). Thereafter, color correction is performed on an input image by use of the correction characteristics stored in the LUT (step S15). Thus, it is possible to obtain characteristics perpetually close to the target display characteristics in view of a user.

Next, a correction device for a display device according to the present embodiment will be described.

The following embodiment employs the CIE1931 color system having XYZ values, representing target characteristics forming the basis of correction, while performing measurement on a display device with XYZ values of the CIE1931 color system, wherein it is equipped with a plurality of conversion means, arranged separately, causing conversion between X10Y10Z10 values of the CIE1964 color system and XYZ values of the CIE1931 color system, thus calculating LUT characteristics. Generally speaking, a colorimeter for measuring display characteristics, and reference color standards cannot deal with X10Y10Z10 values of the CIE1964 color system; hence, it is necessary to use a plurality of conversion means for converting XYZ values of the CIE1931 color system. Using this conversion process, it is possible to mask processing of X10Y10Z10 values of the CIE1964 color system from any user; hence, it is possible to obtain good color matching characteristics in correcting a display device using XYZ values of the CIE1931 color system.

First Embodiment

Figure 2:
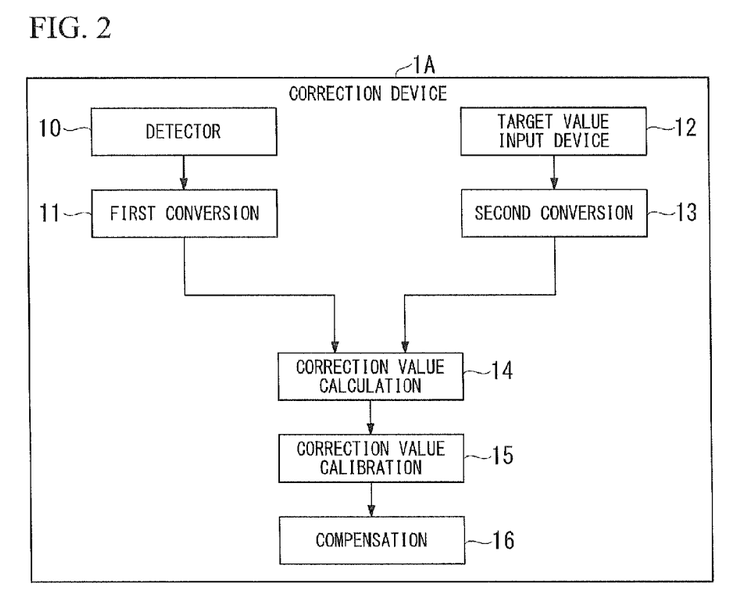
FIG. 2 A block diagram illustrating a correction device for correcting a display device according to a first embodiment.

Next, a correction device for a display device according to the present embodiment will be described with reference to FIG. 2. FIG. 2 is a block diagram illustrating a correction device for correcting a display device according to a first embodiment. The correction device of a display device in this figure is installed in a display device.

In a correction device 1A of a display device, a detector 10 measures an image displayed in a display device so as to measure and detect XYZ values representing tristimulus values according to the CIE1931 color system. The detector 10 measures a display image with an optical sensor, thus detecting the measured XYZ values. A first conversion part 11 calculates measured X10Y10Z10 values, representing tristimulus values of X10Y10Z10 values according to the CIE1964 color system, based on the measured XYZ values of the CIE1931 detected by the detector 10. Alternatively, it is possible to directly measure X10Y10Z10 values with an optical sensor.

This calculation can be carried out according to estimation using the following equation (1). Herein, coefficients can be changed in response to display characteristics.

[Equation 1]

$$\begin{pmatrix} X10 \\ Y10 \\ Z10 \end{pmatrix} = \begin{pmatrix} 0.868 & 0.081 & 0.017 \\ -0.013 & 0.972 & 0.037 \\ 0.020 & -0.045 & 0.990 \end{pmatrix} \begin{pmatrix} X \\ Y \\ Z \end{pmatrix} \quad (1)$$

A target value input device 12 fetches and inputs target XYZ values, corresponding to target XYZ values according to the CIE1931 color system, from an external device. A second conversion part 13 calculates target X10Y10Z10 values of the CIE1964 color system based on target XYZ values, representing tristimulus values for a target color of the CIE1931 color system.

This calculation can be carried out according to estimation using the following equation (2). Herein, coefficients can be changed in response to display characteristics.

[Equation 2]

$$\begin{pmatrix} X10 \\ Y10 \\ Z10 \end{pmatrix} = \begin{pmatrix} 0.890 & 0.091 & 0.006 \\ 0.007 & 0.937 & 0.053 \\ 0.017 & -0.031 & 0.977 \end{pmatrix} \begin{pmatrix} X \\ Y \\ Z \end{pmatrix} \quad (2)$$

A correction value calculation part 14 compares the measured X10Y10Z10 values, calculated by the first conversion part 11, with the target X10Y10Z10 values, calculated by the second conversion part 12, thus calculating a correction value which allows the measured X10Y10Z10 values to match the target X10Y10Z10 values. A correction value calibration part 15 rewrites a correction value of the CIE1964 color system, suiting the characteristics of a display device, with a correction value of the CIE1931 color system. A compensation part 16 performs color correction so as to control display elements of a display device rendering a target color by use of the correction value of the CIE1931 color system produced by the correction value calibration part 15.

Figure 3:
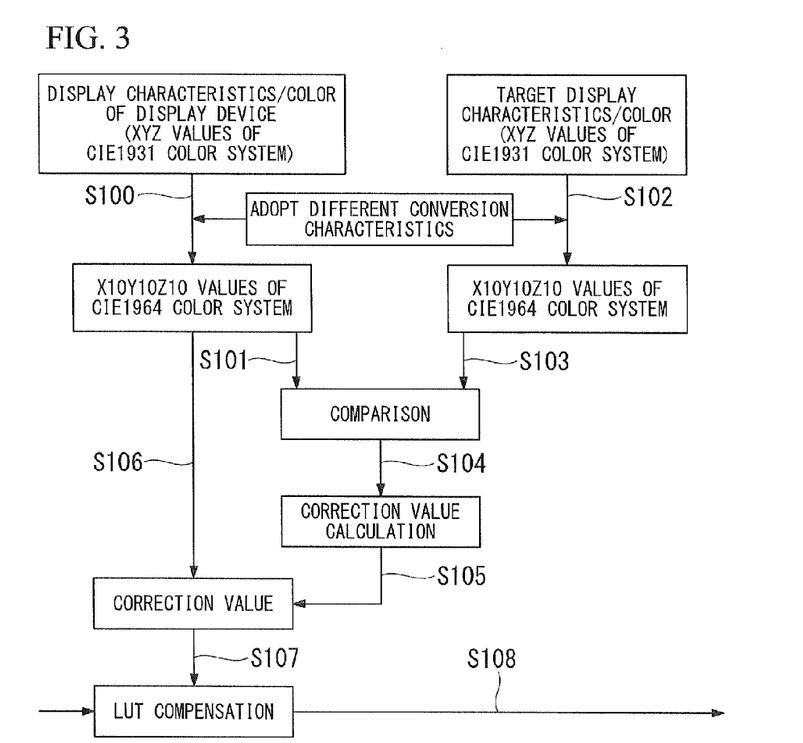
FIG. 3 A flowchart illustrating the operation of a correction device for a display device according to the first embodiment.

Next, the operation of the correction device for a display device shown in FIG. 2 will be described with reference to a flowchart of FIG. 3.

First, the detector 10 measures an image displayed in a display device so as to detect measured XYZ values, representing tristimulus values of the CIE1931 color system (step S100). The first conversion part 11 calculates measured X10Y10Z10 values of the CIE1964 color system based on the measured XYZ values of the CIE1931 color system obtained by the detector 10 (step S101). Alternatively, it is possible to directly measure X10Y10Z10 values with an optical sensor.

The target value input device 12 fetches and inputs target XYZ values, corresponding to target XYZ values of the CIE1931 color system, from an external device (step 102). The second conversion part 13 calculates the target X10Y10Z10 values of the CIE1964 color system based on the target XYZ values of the CIE1931 color system (step S103).

The correction value calculation part 14 compares the measured X10Y10Z10 values, calculated by the first conversion part 11, with the target X10Y10Z10 values, calculated by the second conversion part 12, (step S104), thus calculating a correction value which allows the measured X10Y10Z10 values to match the target X10Y10Z10 values (step S105). The correction value calibration part 15 deals with a correction value of LUT, applied to the measured X10Y10Z10 values of the CIE1964 color system produced by the first conversion part 11, (step S106), thus rewriting the correction value of the CIE1964 color system with a correction value of the CIE1931 color system in response to the characteristics of a display device (step S107). The compensation part 16 performs color correction on a display device by use of the correction value of the CIE1931 color system produced by the correction value calibration part 15 (step S108).

Second Embodiment

Figure 4:
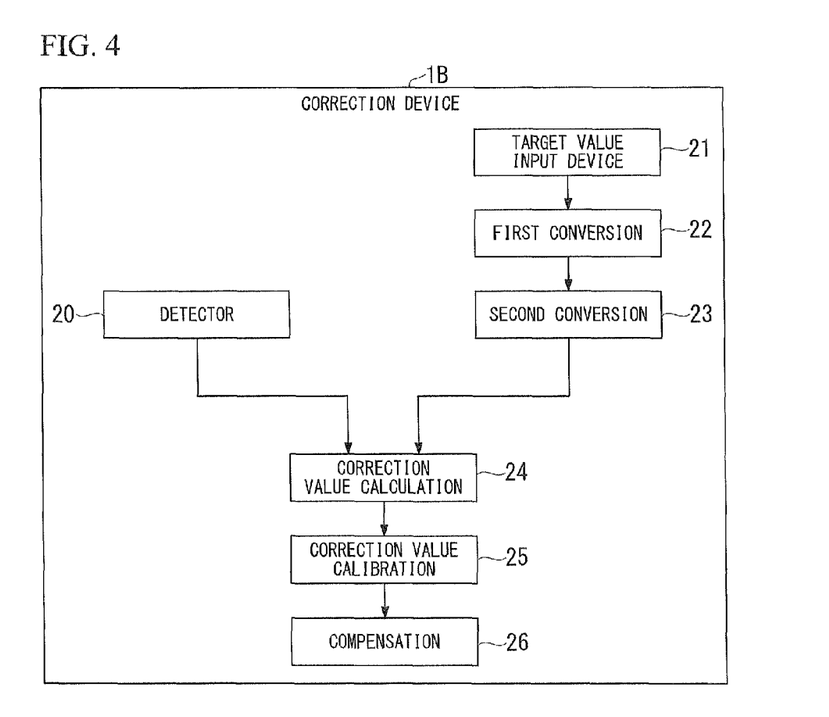
FIG. 4 A block diagram illustrating the function of a correction device for a display device according to a second embodiment.

Next, a second embodiment will be described. FIG. 4 is a block diagram illustrating the function of a correction device 1B for a display device according to the second embodiment.

A detector 20 measures an image displayed in a display device so as to measure and detect XYZ values representing tristimulus values of the CIE1931 color system. The detector 20 measures a display image with an optical sensor, thus detecting the measured XYZ values.

A target value input device 21 fetches and inputs target XYZ values, representing target XYZ values of the CIE1931 color system, from an external device.

A first conversion part 22 calculates target X10Y10Z10 values of the CIE1964 color system based on the target XYZ values representing the target XYZ values of the CIE1931 color system.

This calculation can be carried out by way of estimation using the following equation (3). Herein, coefficients can be changed in response to display characteristics.

[Equation 3]

$$\begin{pmatrix} X10 \\ Y10 \\ Z10 \end{pmatrix} = \begin{pmatrix} 0.868 & 0.081 & 0.017 \\ -0.013 & 0.972 & 0.037 \\ 0.020 & -0.045 & 0.990 \end{pmatrix} \begin{pmatrix} X \\ Y \\ Z \end{pmatrix} \quad (3)$$

A second conversion part 23 calculates target XYZ values of the CIE1931, according to the display characteristics of a display device, based on the target X10Y10Z10 values produced by the first conversion part 22.

This calculation can be carried out by way of estimation using the following equation (4). Herein, coefficients can be changed in response to display characteristics.

[Equation 4]

$$\begin{pmatrix} X10 \\ Y10 \\ Z10 \end{pmatrix} = \begin{pmatrix} 0.890 & 0.091 & 0.006 \\ 0.007 & 0.937 & 0.053 \\ 0.017 & -0.031 & 0.977 \end{pmatrix} \begin{pmatrix} X \\ Y \\ Z \end{pmatrix} \quad (4)$$

A correction value calculation part 24 compares the measured XYZ values, detected by the detector 20, with the target XYZ values, produced by the second conversion part 23, thus producing a correction value which allows the measured XYZ values to match the target XYZ values. A correction value calibration part 25 rewrites the correction value of the CIE1964 color system, suiting the display characteristics of a display device, with a correction value of the CIE1931 color system. A compensation part 26 performs color correction so as to control display elements of a display device rendering a target color by use of the correction value of the CIE1931 color system produced by the correction value calibration part 15.

Figure 5:
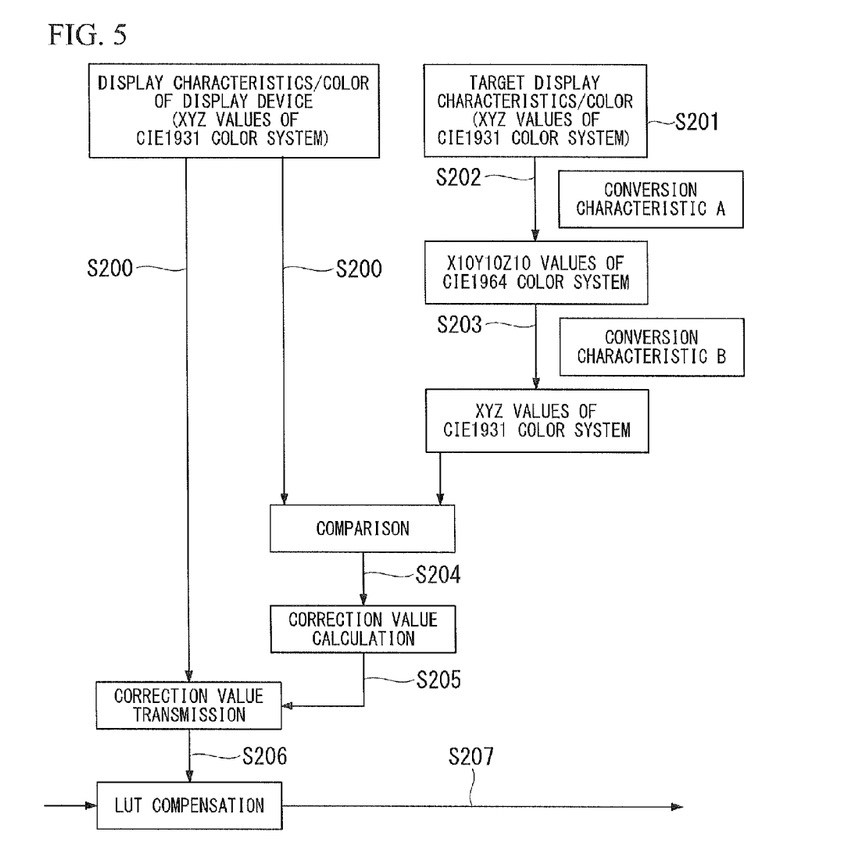
FIG. 5 A flowchart illustrating the operation of a correction device for a display device according to the second embodiment.

Next, the operation of the correction device 1B for a display device shown in FIG. 4 will be described with reference to a flowchart of FIG. 5.

First, the detector 20 measures an image displayed in a display device so as to measure and detect XYZ values representing tristimulus values of the CIE1931 color system (step S200). The target value input device 21 fetches and inputs target XYZ values, representing target XYZ values of the CIE1931 color system, from an external device (step S201).

The first conversion part 22 calculates target X10Y10Z10 values of the CIE1964 color system based on the target XYZ values of the CXIE1931 color system (step S202). The second conversion part 23 calculates target XYZ values of the CIE1931 color system, suiting the display characteristics of a display device, based on the target X10Y10Z10 values produced by the first conversion part 22 (step S203).

The correction value calculation part 24 compares the measured XYZ values, detected by the detector 20, with the target XYZ values, produced by the second conversion part 23 (step S204), thus producing a correction value which allows the measured XYZ values to match the target XYZ values (step S205). The correction value calibration part 25 rewrites the correction value of the CIE1964, suiting the characteristics of a display device, with a correction value of the CIE1931 color system (step S206). The compensation part 26 performs color correction to control display elements of a display device rendering a target color by use of the correction value of the CIE1931 color system (step S207).

In the foregoing embodiment, the first conversion part 22 may convert the measured XYZ values of the CIE1931 color system into the measured X10Y10Z10 values of the CIE1964 color system in accordance with the characteristics of a display device; subsequently, the second conversion part 23 may convert the measured X10Y10Z10 values of the CIE1964 color system, produced by the first conversion part 22, into the measured XYZ values of the CIE1931 color system. Then, the correction value calculation part 24 may produce a correction value which allows the detection result of the detector 20 to match the XYZ values of the CIE1931 color system produced by the second conversion part 23.

Third Embodiment

Figure 6:
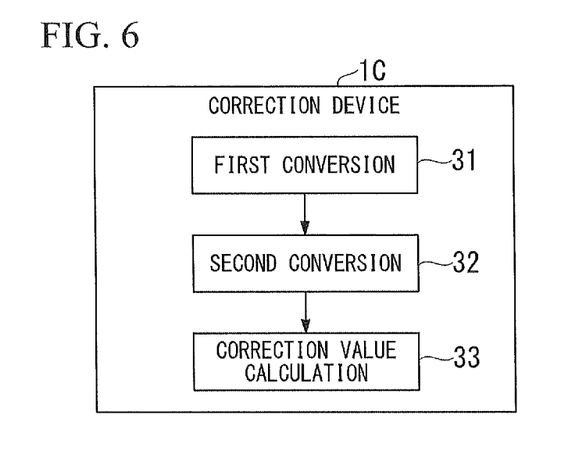
FIG. 6 a block diagram illustrating the function of a correction device for a display device according to a third embodiment.

Next, a third embodiment will be described. FIG. 6 is a block diagram illustrating the configuration of a correction device 1C for a display device according to the present embodiment. For example, the correction device 1C for a display device shown in this figure, which is installed in a personal computer, utilizes an ICC (International Color Consortium) profile externally of the display device so as to perform color correction on the display device (e.g. a projector) which is a matching subject.

A first conversion part 31 calculates X10Y10Z10 values of the CIE1964 color system based on XYZ values of the CIE1931 color system representing target display characteristics, corresponding to the measured display characteristics of a display device or target chromaticity. The first conversion part 31 calculates X10Y10Z10 values of the CIE1964 color system based on XYZ values of the CIE1931 color system in accordance with the following equation (5). Herein, coefficients can be changed in response to display characteristics.

[Equation 5]

$$\begin{pmatrix} X10 \\ Y10 \\ Z10 \end{pmatrix} = \begin{pmatrix} 0.868 & 0.081 & 0.017 \\ -0.013 & 0.972 & 0.037 \\ 0.020 & -0.045 & 0.990 \end{pmatrix} \begin{pmatrix} X \\ Y \\ Z \end{pmatrix} \quad (5)$$

A second conversion part 32 converts the X10Y10Z10 values of the CIE1964 color system, produced by the first conversion part 31, into XYZ values of the CIE1931 color system (C) in accordance with characteristics of a matching subject (e.g. a projector device). A second conversion part 32 calculates X10Y10Z10 values of the CIE1964 color system in accordance with the following equation (6). Herein, coefficients can be changed in response to display characteristics.

[Equation 6]

$$\begin{pmatrix} X10 \\ Y10 \\ Z10 \end{pmatrix} = \begin{pmatrix} 0.890 & 0.091 & 0.006 \\ 0.007 & 0.937 & 0.053 \\ 0.017 & -0.031 & 0.977 \end{pmatrix} \begin{pmatrix} X \\ Y \\ Z \end{pmatrix} \quad (6)$$

A correction value calculation part 33 translates values produced by the second conversion part 32 as characteristics of a display device, thus describing an ICC profile.

Thus, in different devices inputting or outputting XYZ values of the CIE1931 color system, it is possible to correct chromaticity according to X10Y10Z10 characteristics of the CIE1964 color system between those devices. Therefore, it is possible to correct chromaticity in a device using X10Y10Z10 values of the CIE1964 color system based on XYZ values of the CIE1931 color system produced by another device, thus improving color matching with a large screen.

In the above, X10Y10Z10 values of the CIE1964 color system are not compatible to XYZ values of the CIE1931 color system serving as an industrial standard. Therefore, it is difficult to produce X10Y10Z10 values of the CIE1964 color system, corresponding to XYZ values of the CIE1931 color system being given, and it is difficult to perform inverse conversion as well. Therefore, it is difficult to directly use X10Y10Z10 values of the CIE1964 color system as a report regarding an image quality target in adjustment or the adjustment result (normally, describing real characteristics of a display device as an ICC profile), but the foregoing embodiments are able to provide a correction procedure for obtaining a target color.

It is possible to adopt the present invention in any industry using display devices which need to be stabilized in color reproduction. For example, it is possible to apply the present invention to graphics design, printing offices, medical displays, etc.

REFERENCE SIGNS LIST 1A, 1B 1C correction device
10, 20 detector
11, 22, 31 first conversion part
12, 21 target value input device
13, 23, 32 second conversion part
14, 24, 33 correction value calculation part
15, 25 correction value calibration part
16, 26 compensation part

The invention claimed is:

1. A correction device for a display device, comprising:
a detector configured to measure an image displayed in the display device so as to detect measured XYZ values representing tristimulus values of a CIE1931 color system;
a first convertor configured to calculate measured X10Y10Z10 values of a CIE1964 color system based on the measured XYZ values of the CIE1931 color system by use of a first conversion characteristic with reference to characteristics of the display device;
a second convertor configured to calculate target X10Y10Z10 values of the CIE1964 color system based on target XYZ values representing tristimulus values of a target color in the CIE1931 color system by use of a second conversion characteristic different from the first conversion characteristic;
a correction value calculator configured to compare the measured X10Y10Z10 values with the target X10Y10Z10 values so as to produce a correction value having the measured X10Y10Z10 values matched with the target X10Y10Z10 values;
a correction value calibrator configured to rewrite the correction value of the CIE1964 color system, suiting to the characteristics of the display device, with a correction value of the CIE1931 color system; and
a compensator configured to carry out a color correction on the display device in accordance with the rewritten correction value of the CIE1931 color system,
wherein the X10Y10Z10 values of the CIE1964 color system exhibit visual characteristics different from an observatory sight defined by the XYZ values of the CIE1931 color system, and
wherein the target XYZ values of the CIE1931 color system represent a chromaticity of a white color and primary colors as well as a gradation luminous characteristic.

2. A correction device for a display device, comprising:
a detector configured to measure an image displayed in the display device so as to detect measured XYZ values representing tristimulus values of a CIE1931 color system;
a first convertor configured to calculate target XYZ values of the CIE1931 color system based on X10Y10Z10 values representing tristimulus values of a target color in a CIE1964 color system by use of a first conversion characteristic;
a correction value calculator configured to produce a correction value having a detection result of the detector matched with the target XYZ values of the CIE1931 color system produced by the first convertor; and
a compensator configured to carry out a color correction on the display device in accordance with the correction value of the CIE1931 color system produced by the correction value calculator,
wherein the X10Y10Z10 values of the CIE1964 color system exhibit visual characteristics different from an observatory sight defined by the XYZ values of the CIE1931 color system, and
wherein the target XYZ values of the CIE1931 color system represent a chromaticity of a white color and primary colors as well as a gradation luminous characteristic.

3. A correction method for a display device, comprising:
measuring an image displayed in the display device and detecting measured XYZ values representing tristimulus values of a CIE1931 color system;
calculating measured X10Y10Z10 values of a CIE1964 color system based on the measured XYZ values of the CIE1931 color system by use of a first conversion characteristic with reference to characteristics of the display device;
calculating target X10Y10Z10 values of the CIE1964 color system based on target XYZ values representing tristimulus values of a target color in the CIE1931 color system by use of a second conversion characteristic different from the first conversion characteristic;
comparing the measured X10Y10Z10 values with the target X10Y10Z10 values, thus producing a correction value having the measured X10Y10Z10 values matched with the target X10Y10Z10 values;
rewriting the correction value of the CIE1964 color system, suiting to the characteristics of the display device, with a correction value of the CIE1931 color system; and carrying out a color correction on the display device in accordance with the rewritten correction value of the CIE1931 color system, wherein the X10Y10Z10 values of the CIE1964 color system exhibit visual characteristics different from an observatory sight defined by the XYZ values of the CIE1931 color system, and wherein the target XYZ values of the CIE1931 color system represent a chromaticity of a white color and primary colors as well as a gradation luminous characteristic.

4. The correction device of claim 1, wherein the values of the CIE1964 color system are not compatible to the CEI1931 color system.

5. The correction device of claim 2, wherein the values of the CIE1964 color system are not compatible to the CEI1931 color system.

6. The correction method of claim 3, wherein the values of the CIE1964 color system are not compatible to the CEI1931 color system.

7. The correction device of claim 1, wherein said first conversion characteristic comprises a first coefficient.

8. The correction device of claim 1, wherein said second conversion characteristic comprises a second coefficient.

9. The correction device of claim 7, wherein said second conversion characteristic comprises a second coefficient.

10. The correction device of claim 2, wherein said first conversion characteristic comprises a first coefficient.

11. The correction device of claim 2, wherein said second conversion characteristic comprises a second coefficient.

12. The correction device of claim 10, wherein said second conversion characteristic comprises a second coefficient.

13. The correction method of claim 3, wherein said first conversion characteristic comprises a first coefficient.

14. The correction method of claim 3, wherein said second conversion characteristic comprises a second coefficient.

15. The correction method of claim 13, wherein said second conversion characteristic comprises a second coefficient.

16. The correction device of claim 1, wherein the correction value calculator produces the correction value based on a lookup table (LUT).

17. The correction device of claim 2, wherein the correction value calculator produces the correction value based on a lookup table (LUT).

18. The correction method of claim 3, wherein the correction value is rewritten based on a lookup table (LUT).

* * * * *